United States Patent
Lee et al.

(10) Patent No.: US 7,324,311 B2
(45) Date of Patent: Jan. 29, 2008

(54) RIE DEFINED CPP READ HEADS

(75) Inventors: Kim Y. Lee, Fremont, CA (US); Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 443 days.

(21) Appl. No.: 10/857,095

(22) Filed: May 28, 2004

(65) Prior Publication Data

US 2005/0264956 A1    Dec. 1, 2005

(51) Int. Cl.
   *G11B 5/33*   (2006.01)
   *G11B 5/127*  (2006.01)
(52) U.S. Cl. .............................. 360/324.12; 360/324.1
(58) Field of Classification Search ............ 360/324.1, 360/324.11, 324.12
   See application file for complete search history.

(56) References Cited

U.S. PATENT DOCUMENTS

| | | | |
|---|---|---|---|
| 5,748,399 A * | 5/1998 | Gill | 360/66 |
| 6,315,875 B1 | 11/2001 | Sasaki | 204/192.34 |
| 6,473,279 B2 * | 10/2002 | Smith et al. | 360/324.12 |
| 6,339,983 B1 | 12/2003 | Kagami et al. | 427/130 |
| 6,714,388 B2 * | 3/2004 | Hasegawa et al. | 360/324.11 |
| 6,865,062 B2 * | 3/2005 | Pinarbasi | 360/324.11 |
| 6,943,997 B2 * | 9/2005 | Gill | 360/324.12 |
| 7,002,782 B2 * | 2/2006 | Hasegawa et al. | 360/324.12 |
| 2002/0034055 A1 | 3/2002 | Seyama et al. | 360/324.11 |
| 2002/0131215 A1 * | 9/2002 | Beach | 360/324.2 |
| 2002/0135948 A1 | 9/2002 | Funayama et al. | 360/324.1 |
| 2002/0150791 A1 | 10/2002 | Yuasa et al. | 728/692 |
| 2003/0011459 A1 * | 1/2003 | Hasegawa et al. | 336/200 |
| 2003/0107848 A1 | 6/2003 | Watanabe et al. | 360/320 |
| 2003/0197988 A1 | 10/2003 | Hasegawa et al. | 360/324.12 |
| 2005/0219770 A1 * | 10/2005 | Gill | 360/324.2 |

* cited by examiner

*Primary Examiner*—Andrea Wellington
*Assistant Examiner*—Jason M. Garr
(74) *Attorney, Agent, or Firm*—Zilka-Kotab, PC

(57) ABSTRACT

A magnetoresistive sensor having a trackwidth defined by AFM biasing layers disposed beneath a free layer of the sensor. The present invention provides a current in plane magnetoresistive sensor that includes a non-magnetic, electrically conductive layer in a trackwidth region. The non-magnetic, electrically conductive layer can be for example Ta, but could be some other material. This non-magnetic, electrically conductive layer has first and second laterally opposed sides and a planar upper surface. First and second insulating layers are formed at each of the sides of the non-magnetic, electrically conductive layer, and bias layers extend laterally outward from the insulation layers. The bias layers can be constructed of either an antiferromagnetic (AFM) material or could be constructed of a hard magnetic material such as CoPtCr. The bias layers have planar upper surfaces that are coplanar with the upper surface of the non-magnetic, electrically conductive layer.

15 Claims, 9 Drawing Sheets

RIE DEFINED CPP READ HEADS

FIELD OF THE INVENTION

The present invention relates to magnetoresistive sensors and more particularly to a novel sensor design having a track width defined by AFM pinned free layer outer portions, the AFM being disposed beneath the free layer.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor. In a CPP sensor design, the magnetic shields usually double as electrical leads for supplying a sense current to the sensor. Therefore, in CPP sensor design, the shields/leads contact the top and bottom of the sensor, and the space between the shields defines the length of a bit of data.

The ever increasing demand for data storage density and data rate have increasingly pushed the limits of data storage designs. Recently in efforts to overcome such limits, engineers and scientists have focused on the use of perpendicular recording. In a perpendicular recording system a write pole emits a highly concentrated magnetic field that is directed perpendicular to the surface of the medium (eg. the disk). This field in turn magnetizes a localized portion of the disk in a direction perpendicular to the surface of the disk, thereby creating a bit of data. The resulting flux travels through the disk to a return path having a much larger area than the area in which the bit was recorded. The increased interest in perpendicular recording has lead to an increased interest in current perpendicular to plane (CPP) sensors, which are particularly suited to use in perpendicular recording.

In order to construct magnetoresistive sensors, either current in plane (CIP) or current perpendicular to plane (CPP), manufacturers have used processes that include first depositing all of the sensor layers (ie. free layer, spacer, pinned layers) as full film layers. A photoresist mask has then been placed over the area where the sensor is to be formed and an ion milling process has been performed to remove sensor material outside of the sensor area, ie. outside of the trackwidth region of the sensor. After removing unwanted sensor material, a hard magnetic material has then been deposited to form hard magnets for biasing the free layer. If the sensor is to be a CPP sensor, an insulator is provided between the hard magnetic material and the sides of the sensor.

Several problems are inherent in this prior art manufacturing method, however. For instance, the subtractive ion milling procedure used to form the sensor results in a poorly defined edge, which slopes downward rather than being a sharp transition. Furthermore, the ion milling procedure used to form sensor edges actually damages the sensor materials at the edges, and our investigation has revealed that this damage propagates into the active area of the sensor.

The drive for ever increases data density has lead a push for sensors having ever decreasing trackwidths. While the above discussed problems associated with the prior art ion milling subtractive method for defining the sensor may have been acceptable at larger trackwidths, when these trackwidths decrease the problems are greatly exacerbated. For example, the poor sensor edge definition and damage to the sensor material at the sensor edge caused by the ion milling method would constitute an acceptably small percentage of the total sensor area in a large trackwidth sensor. However, as the trackwidth decreases, the damaged portion and poorly defined edge transition become an unacceptably large percentage of the total sensor area. Therefore, there is a need for a novel sensor design and novel method of manufacturing such a sensor that does not require the use of ion milling to define sensor width. Such a design and method would preferably include a novel means for defining the track width of the sensor so that excellent track width definition can be achieved in a very small track width design.

SUMMARY OF THE INVENTION

The present invention provides a current in plane magnetoresistive sensor that includes a non-magnetic, electrically conductive layer in a trackwidth region. The non-magnetic, electrically conductive layer can be for example Ta, but could be some other material. This non-magnetic, electrically conductive layer has first and second laterally opposed sides and a planar upper surface. First and second insulating layers are formed at each of the sides of the non-magnetic, electrically conductive layer, and bias layers extend laterally outward from the insulation layers. The bias layers can be constructed of either an antiferromagnetic (AFM) material or could be constructed of a hard magnetic material such as CoPtCr. The bias layers have planar upper surfaces that are coplanar with the upper surface of the non-magnetic, electrically conductive layer.

The non-magnetic, electrically conductive layer can be constructed by depositing the layer, such as Ta, as a full film and then forming a photoresist mask over the area that is to be the active area, or track width region, of the sensor. Then a reactive ion etch (RIE) process is used to remove portions of the non-magnetic, electrically conductive layer that are not covered by the mask, forming the first and second side edges of the non-magnetic, electrically conductive layer.

The insulator can be for example Al2O3, or some other dielectric material, and can be deposited full film. The bias layers can then be deposited and a chemical mechanical polishing process can be performed to form a common planar upper surface across the bias layers and the non-magnetic electrically conductive material layer.

Advantageously, the sensor films can then be deposited full film on this planar upper surface of the bias layers and the non-magnetic, electrically conductive layer. The deposition of the sensor layers can be preceded by a surface treatment to achieve a favorable interface for strong exchange coupling. First, the surface is subjected to sputter etch cleaning. This is followed by deposition of a fresh 3 to 5 nm thick layer of bias material. It is important that the surface treatment and the deposition of the sensor films are done in-situ, i.e. without breaking vacuum. The free layer of the sensor can be deposited first followed by the spacer layer (in the case of a CPP GMR) or barrier (in the case of a tunnel valve). After the spacer layer, a pinned layer structure can be formed, which may be either a self pinned structure or an AFM pinned structre, and may be either an AP pinned structure or a simple pinned structure.

With the free layer deposited first, the portions of the free layer formed over the hard bias layers are pinned, while the portions of the magnetic moment of the free layer portions disposed within the trackwidth region is free to rotate in response to a magnetic field. The thin 3-5 nm bias layer deposited as described herein above does not affect the portion of the free layer disposed within the trackwidth region as its thickness is less than the critical thickness required for exchange coupling. It is, therefore, an advantage of the present invention that the track width (or active area) of the sensor is defined by inner edge of the biasing layer, rather than by an imprecise ion milling procedure. It is also an advantage of the invention, that no ion milling procedure is need, thereby avoiding damage to the sensor material, and imprecise trackwidth control. These and other advantages of the invention will become apparent upon further reading of the following Detailed Description in conjunction with the various Figures.

BRIEF DESCRIPTION OF THE DRAWINGS

For a fuller understanding, of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
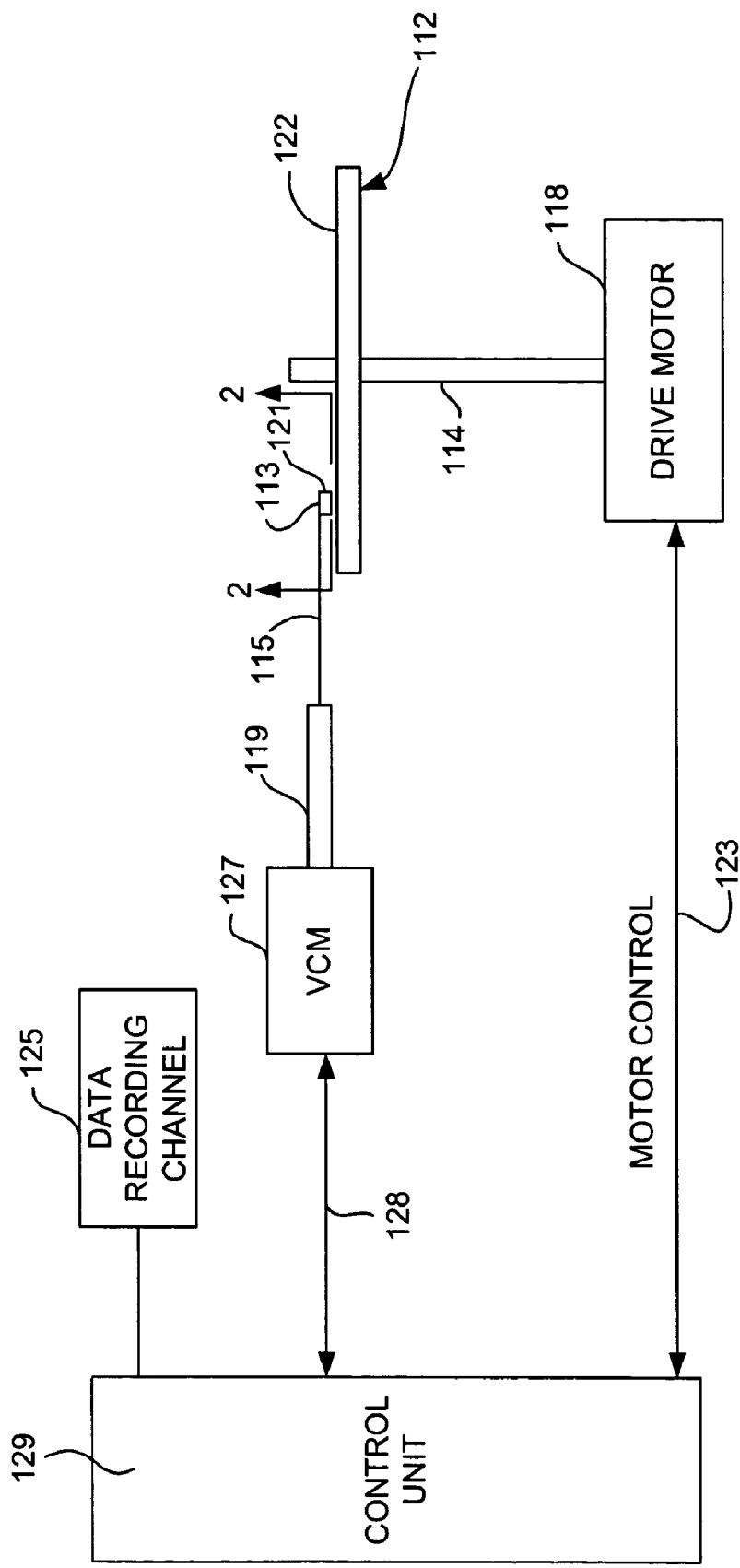
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to at d from write and read heads of the magnetic head assembly 121 by way of recording channel 125.

Figure 2:
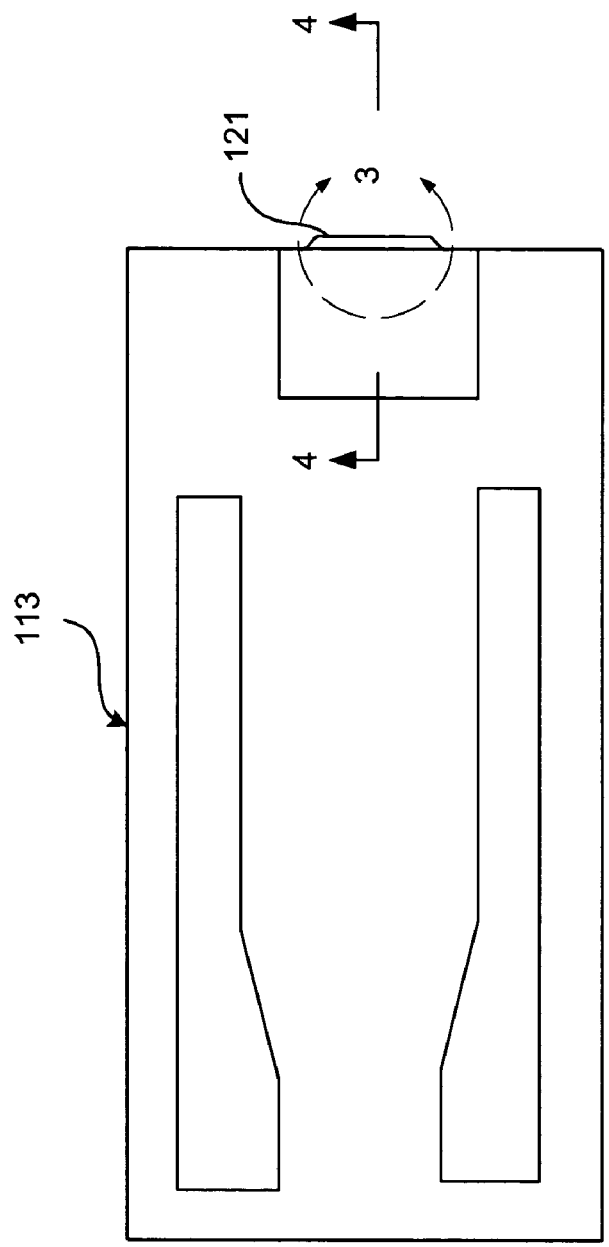
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
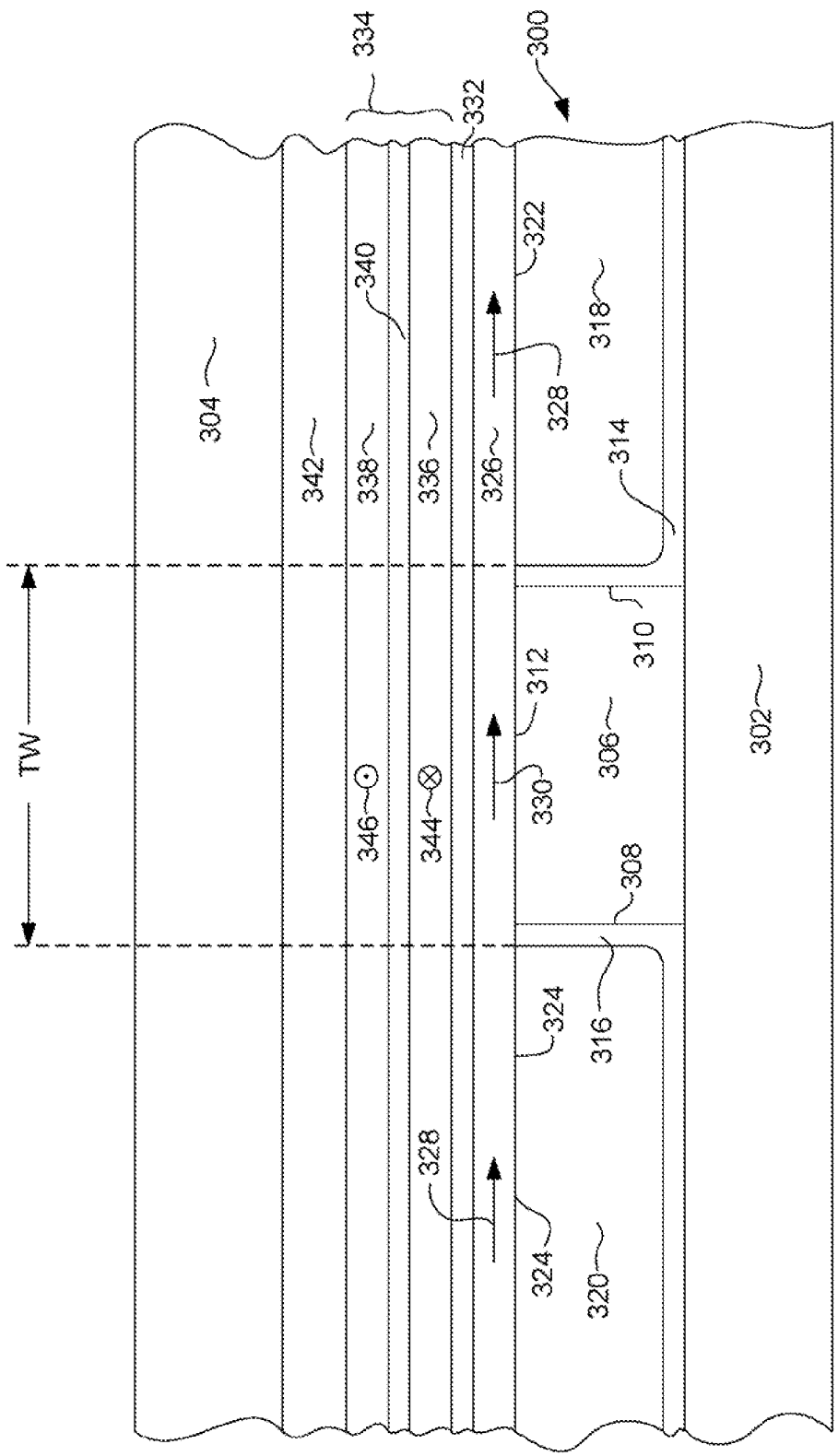
FIG. 3 is an ABS view of a magnetic sensor according to an embodiment of the present invention taken from circle 3 of FIG. 2, shown enlarged and rotated 90 degrees counterclockwise.

With reference now to FIG. 3, the sensor 300 is sandwiched between first and second magnetic shields which also function as electrical leads for providing sense current to the sensor. A non-magnetic, electrically conductive structure 306 is formed in a trackwidth region of the sensor 300, and is formed with first and second laterally opposed side walls 308, 310 and a planar upper surface 312. The non-magnetic, electrically conductive structure can be formed of for example Ta. For purposes of simplicity, the non-magnetic, electrically conductive structure 306 will hereinafter be referred to as a pedestal structure 306.

First and second insulation layers 314, 316 are formed at either side 308, 310 of the pedestal structure 306. Although the insulation layers 314, 316 cover the side walls 308, 310, they also extend laterally outward extending over the surface of the first shield 302 outside of the track width region TW. Although shown here in an ABS view, it should be pointed out that the insulation layer would also extend across the back edge of the pedestal structure 306 in the stripe height direction. In this sense, if viewed in cross section from above, the insulation layer extending from the side walls would form a "U" shape (not shown).

First and second bias layers 318, 320 extend laterally outward from the upward extending portion of the insulation layer. The bias layers 318, 320 each have an upper surface 322, 324 that is coplanar with the upper surface 312 of the non-magnetic, electrically conductive pedestal structure 306. The bias layers can be hard magnetic layers constructed of a high coercivity magnetic material such as CoPtCr, or could also be constructed of an antiferromagnetic (AFM) material such as PtMn or some other AFM material. The choice of whether to construct the bias layers 318, 320 as hard magnetic layers or AFM layers is determined by the amount of free layer biasing needed, as will be described in greater detail below.

With continued reference to FIG. 3, a ferromagnetic free layer 326 is formed over the coplanar upper surfaces 312, 322, 324 of the pedestal 306 and bias layers 318, 320. The ferromagnetic free layer 326 is exchange coupled with the bias layers 318, 320 in the regions outside the trackwidth region TW. This pins the magnetization 328 of the free layer 326 in the regions outside of the track width TW while leaving the magnetizations 330 of the free layer 326 within the track width TW free to rotate in the presence of a magnetic field. As can be seen from the arrows 328, 330, the magnetization of the free layer is biased in a direction parallel with the ABS.

A spacer layer 332 is formed above the free layer 326 and, like the free layer 326, is also formed as a full film layer extending beyond the Track width (beyond the active area of the sensor). It should be pointed out that the present invention can be embodied in a CPP GMR as well as a tunnel valve. If the sensor 300 is a CPP GMR, then the spacer 332 will be a non-magnetic, electrically conductive layer, such as Cu. On the other hand, if the sensor is a tunnel valve, then the layer 332 will be a thin, non-magnetic, electrically insulating barrier layer formed of a material such as for example $Al_2O_3$.

With reference still to FIG. 3, a pinned layer structure 324 is formed over the spacer/barrier layer 332. The pinned layer structure 334 could be constructed in many various forms, but for purposes of the presently described embodiment will be described as a AFM pinned, antiparallel coupled (AP pinned) pinned layer structure. In this light, the pinned layer structure 334 includes first and second ferromagnetic layers 336, 338 separated by a non-magnetic coupling layer 340. The first and second ferromagnetic layers can be for example, CoFe, NiFe or some other magnetic material. The coupling layer can be constructed of many suitable coupling material, and is preferably Ru. A layer of antiferromagnetic (AFM) material 342 such as PtMn is provided above the pinned layer and is exchange coupled with the second magnetic layer 338 to strongly pin the magnetizations 344, 346 of the magnetic layers 336, 338 of the pinned layer in a direction perpendicular to the ABS.

It should be pointed out also that the pinned layer structure 334 could be a self pinned structure, wherein the pinning is maintained by strong positive magnetostriction and compressive stresses in the sensor. In that case the AFM layer 342 would not be necessary.

Figure 4:
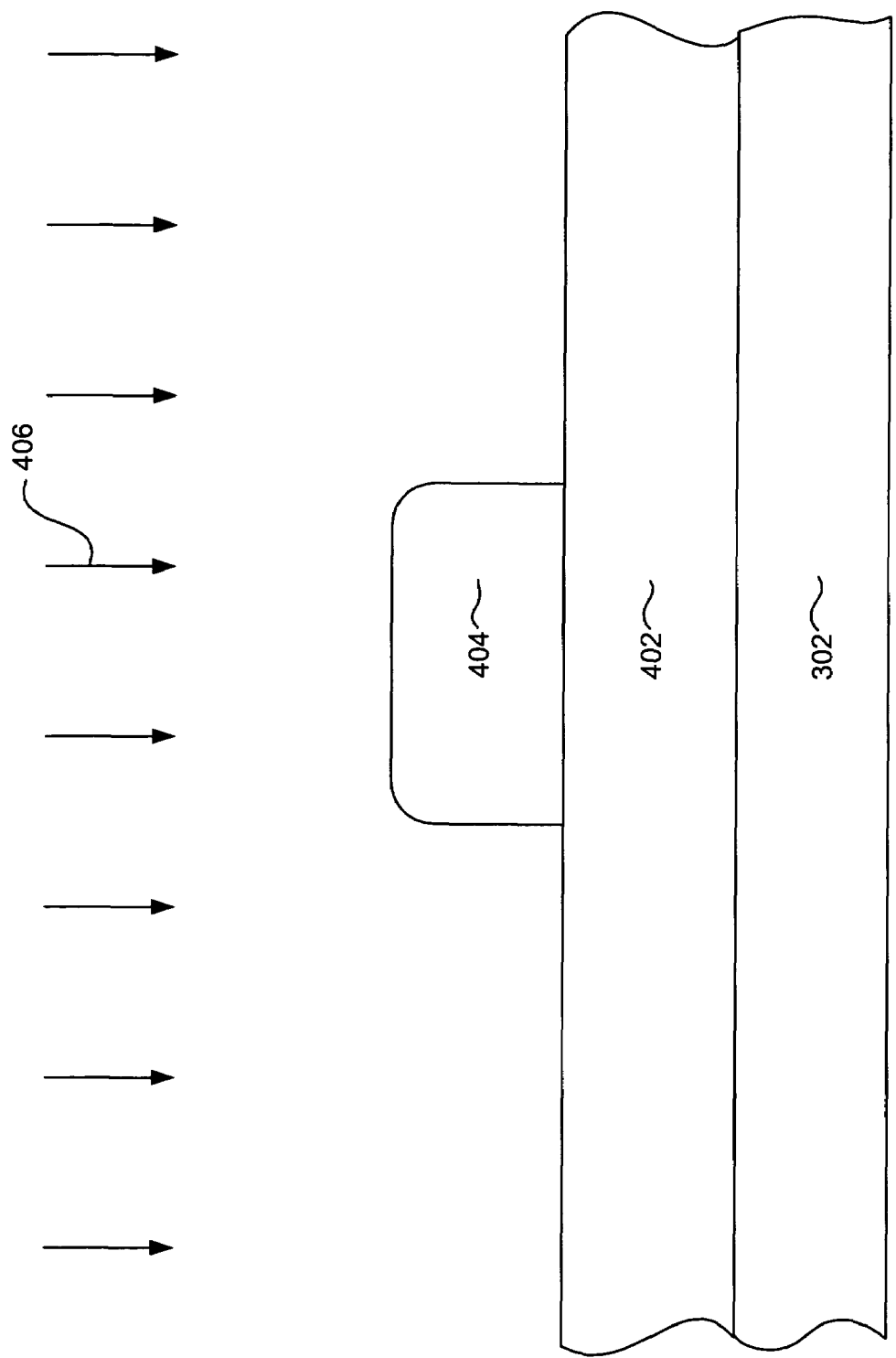
FIGS. 4-9 illustrate a magnetoresistive sensor according an embodiment of the invention in various intermediate stages of manufacture.

With reference now to FIGS. 4-9, a method for constructing a sensor according to an embodiment of the present invention will be described. With particular reference to FIG. 4, the first magnetic shield 302 is provided. Then, a full film layer of electrically conductive, non-magnetic material 402 capable of being removed by reactive ion etching (RIE) is deposited. This layer could be for example Ta. Thereafter, a mask 404, such as a photoresist mask is formed to cover an area that is desired to be the active area of the sensor. A material removal process 406, preferably reactive ion etching (RIE) is then performed to remove portions of the full film layer 402 that are not covered by the mask 404, resulting in the formation of the pedestal 306 as seen with reference to FIG. 5.

Figure 5:
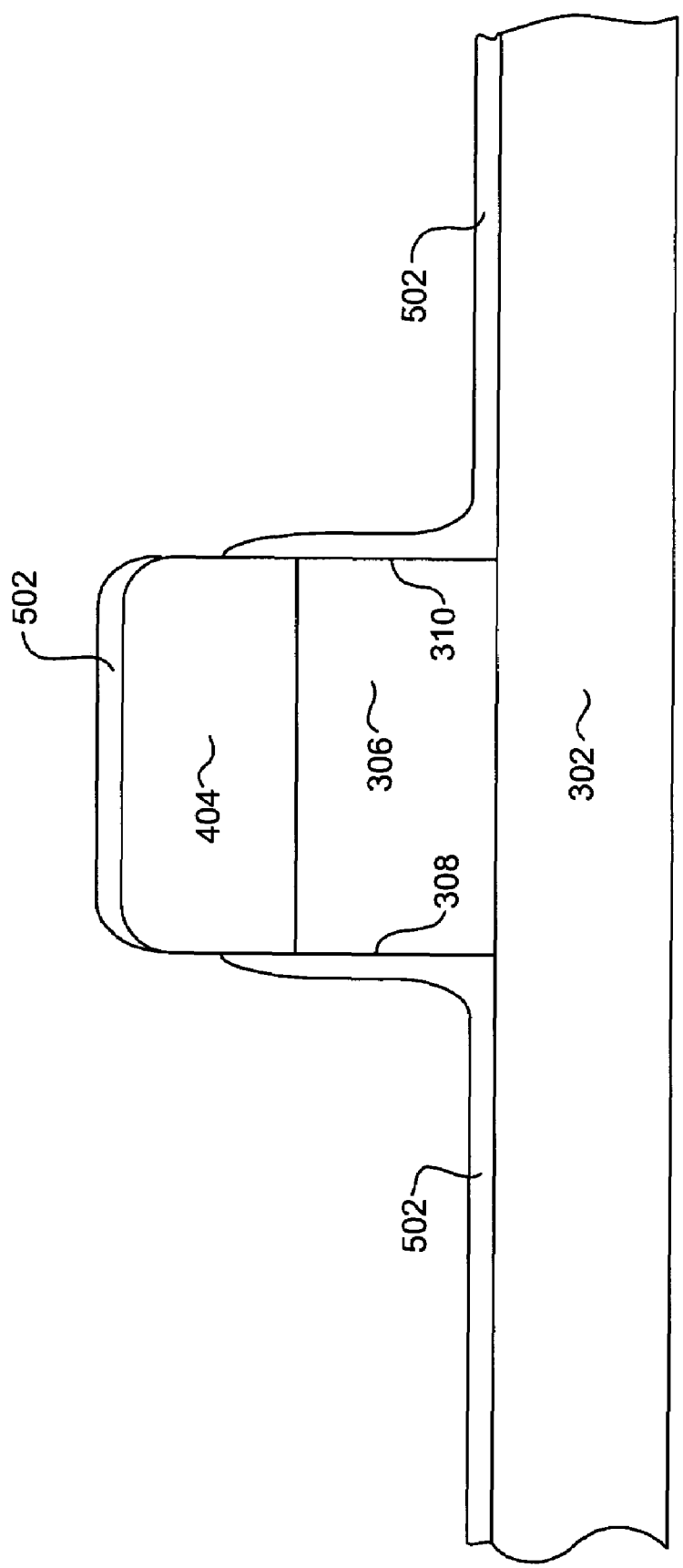

With continued reference to FIG. 5, the pedestal 306 is formed from the electrically conductive, non-magnetic material such as Ta 402 (FIG. 4). An insulation material 502 is deposited full film over the pedestal 306 and shield 302. The insulation material can be for example, $Al_2O_3$, and as can be seen, covers the side walls 308, 310 of the pedestal 306.

Figure 6:
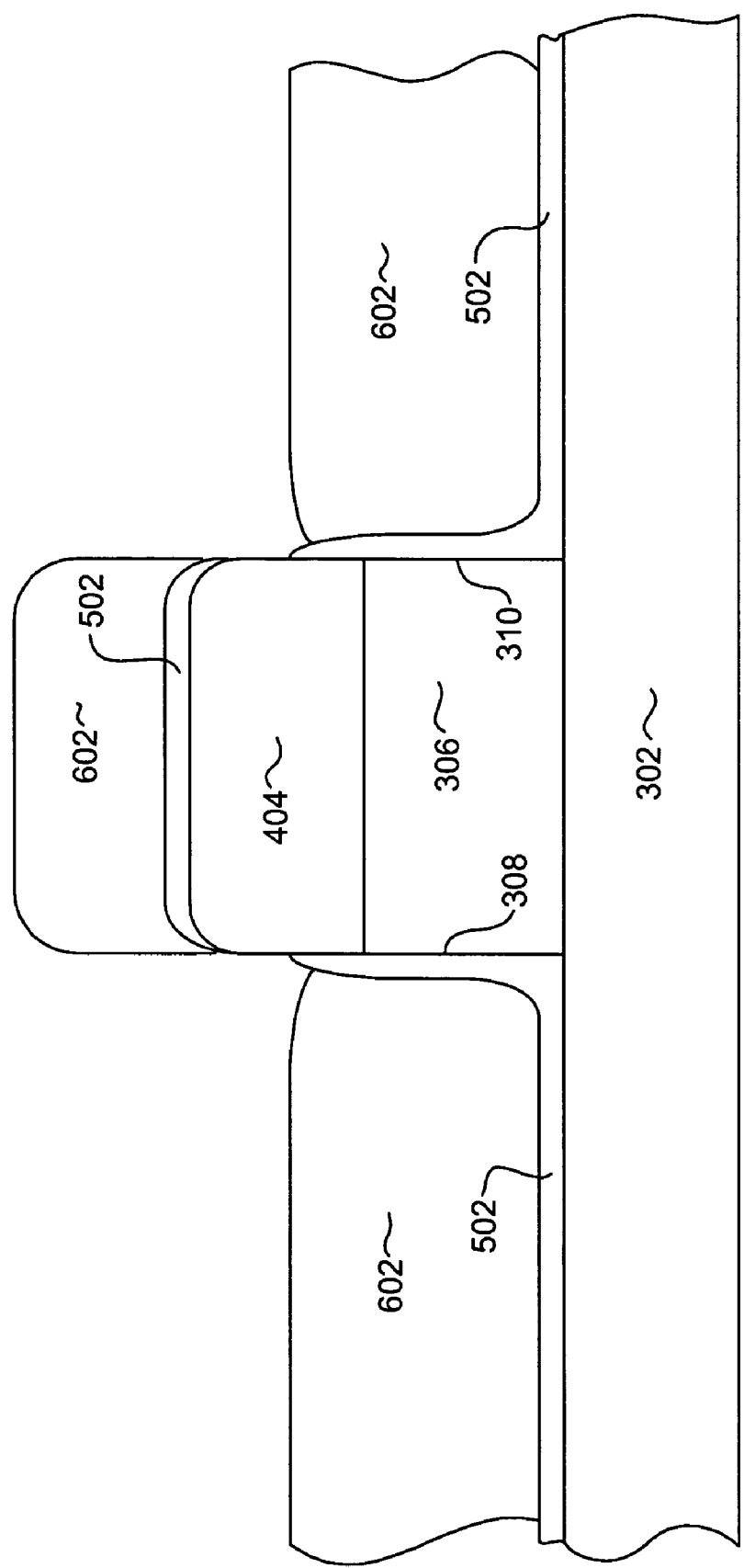
Figure 7:
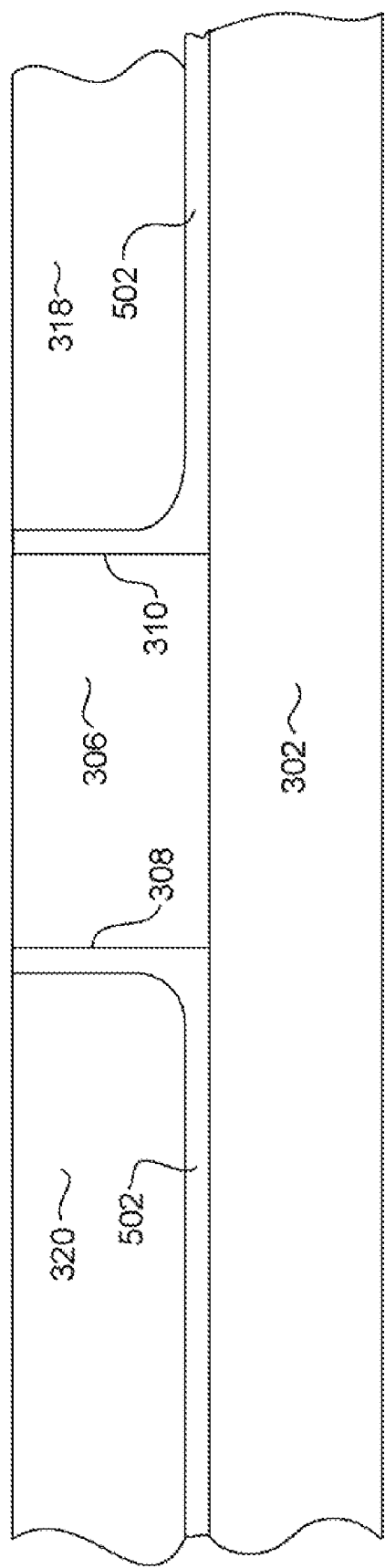

With reference to FIG. 6, bias material 602 is deposited full film. This material can be either an antiferromagnetic material such as PtMn or could also be a hard magnetic (high coercivity) material such as CoPtCr. Thereafter, a chemical mechanical polishing (CMP) process can be performed resulting in the structure shown in FIG. 7. Those skilled in the art will appreciate that the mask 404 could be either chemically lifted off prior to performing the CMP process or could be lifted by the CMP process itself. The CMP process results in a smooth planar surface including the coplanar surfaces 322, 324 of the hard bias layers 318, 320, and the surface 312 of the pedestal 306.

Figure 8:
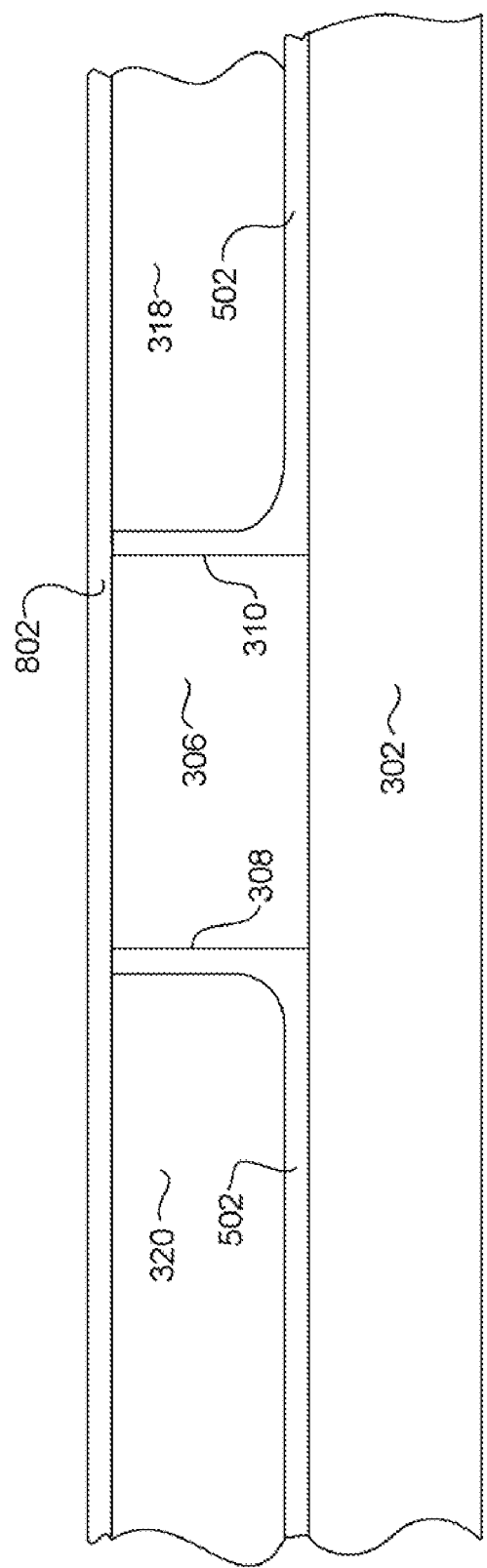

With reference to FIG. 8, a procedure is performed to ensure that a favorable interface exists for strong exchange coupling. First, surface is subjected to sputter etch cleaning. Then a thin, 3-5 nm thick layer of hard magnetic bias material 802 is deposited. This can be for example, the same material used to form the first and second hard bias portions 318. It is important that the surface treatment and the deposition of the thin bias layer be done in-situ, i.e. without breaking vacuum.

Figure 9:
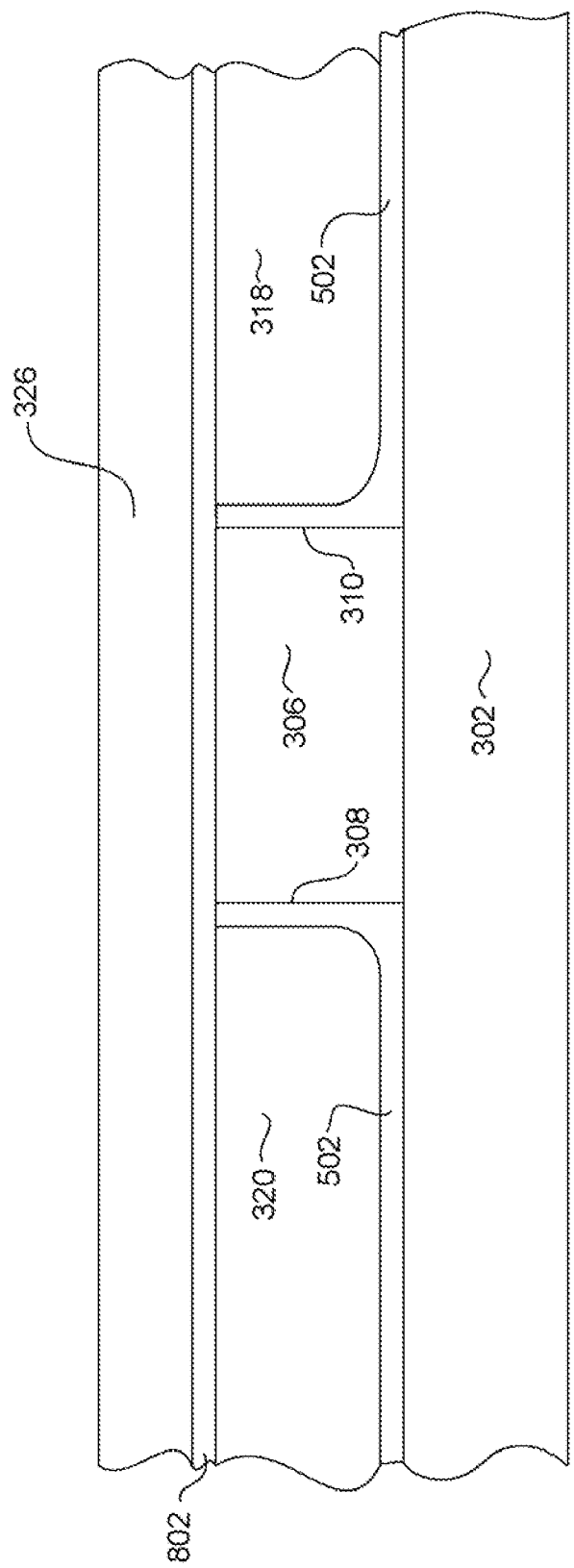

With reference to FIG. 9, the free layer 326 is deposited full film. Advantageously, the thin bias layer is sufficiently thin that it does not affect the free located within the track width region since its thickness is less than the critical thickness required for exchange coupling. The thin bias layer 802 does, however, ensure strong exchange coupling in the regions outside of the track width region.

With reference back to FIG. 3, the remaining sensor layers 332, 334, and 342 as well as the shield can be deposited full film by methods familiar to those skilled in the art.

It will be appreciated that the hard bias layers 318, 320 determine the track width by pinning the active outer portions of the free layer while leaving the inner portions free. The method described above advantageously avoids the use of ion milling, thereby avoiding damage to the sensor materials that would otherwise be associated with such an ion milling process.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head comprising:
   a current perpendicular to plane magnetoresistive sensor having:
       a pedestal constructed entirely of a non-magnetic electrically conductive material, the pedestal having first and second laterally opposed sides defining a trackwidth and having a planar upper surface formed along a first plane and a lower surface formed along a second plane;
       first and second insulation layers formed at said first and second laterally opposed sides of said non-magnetic, electrically conductive pedestal;
       first and second antiferromagnetic AFM layers extending laterally outward from said insulation layers, said first and second AFM layers each having a planar upper surface that is coplanar with said planar upper surface of said non-magnetic, electrically conductive material layer;
       a first ferromagnetic layer formed on said coplanar upper surface of said pedestal non magnetic, electrically conductive material layer and said first and second AFM layers, said ferromagnetic layer being exchange coupled with said first and second AFM layers.

2. A magnetic head as in claim 1, wherein said electrically conductive non-magnetic layer comprises Ta.

3. A magnetic head as in claim 1, wherein said first ferromagnetic layer has a magnetic moment that is free to rotate within said track width and has a magnetic moment that is fixed in regions outside of said trackwidth, said sensor further comprising:
   a non-magnetic, electrically conductive spacer layer formed on said first ferromagnetic layer; and
   a magnetic pinned layer structure formed over said spacer layer.

4. A magnetic head as in claim 3, wherein said pinned layer structure further comprises:
   a second ferromagnetic layer formed over said spacer layer;
   a non-magnetic, electrically conductive coupling layer formed over said second ferromagnetic layer; and
   a third ferromagnetic layer formed over said non-magnetic, electrically conductive spacer layer, said second and third ferromagnetic layers having magnetizations that are antiparallel coupled across said non-magnetic, electrically conductive spacer layer.

5. A magnetic head as in claim 4, further comprising a layer of antiferromagnetic material formed over and exchange coupled with said third ferromagnetic layer.

6. A magnetic head as in claim 1, wherein said first ferromagnetic layer has a magnetic moment that is free to rotate within said track width and has a magnetic moment that is fixed in regions outside of said trackwidth, said sensor further comprising:
   a non-magnetic, electrically insulating barrier layer formed on said first ferromagnetic layer; and
   a magnetic pinned layer structure formed over said non-magnetic, electrically insulating barrier layer.

7. A magnetic head as in claim 1, wherein said first and second insulation layers extend beneath said first and second AFM layers.

8. A magnetic head as in claim 1, wherein said first and second insulation layers comprise $Al_2O_3$.

9. A magnetic head comprising:
   a current perpendicular to plane magnetoresistive sensor having:
       a pedestal constructed entirely of non-magnetic electrically conductive material having first and second laterally opposed sides defining a trackwidth and having a planar upper surface formed along a first plane and a lower surface formed along a second plane;
       first and second insulation layers formed at said first and second laterally opposed sides of said non-magnetic, electrically conductive pedestal layer;

first and second magnetic layers, extending laterally outward from said insulation layers, said first and second magnetic layers each having a planar upper surface that is coplanar with said planar upper surface of said pedestal non-magnetic, electrically conductive material layer, said first and second magnetic layers comprising a high magnetic coercivity (high Hk) material;

a third magnetic layer formed on said coplanar upper surfaces of said non-magnetic, electrically conductive pedestal and said first and second ferromagnetic layers, said third magnetic layer being exchange coupled with said first and second magnetic layers.

10. A magnetic head as in claim 9, wherein said third magnetic layer comprises a low coercivity, high moment magnetic material.

11. A magnetic head as in claim 9, wherein said first and second magnetic layers comprise CoPtCr.

12. A magnetic head as in claim 9, wherein said non-magnetic, electrically conductive pedestal comprises Ta.

13. A magnetic head as in claim 9, further comprising:
a non-magnetic electrically conductive spacer layer formed over said third magnetic layer; and
a magnetic pinned layer structure formed over said non-magnetic, electrically conductive spacer layer.

14. A magnetic head as in claim 9, further comprising:
a non-magnetic electrically insulating barrier layer formed over said third magnetic layer; and
a magnetic pinned layer structure formed over said non-magnetic electrically insulating barrier layer.

15. A magnetic data storage system, comprising:
a motor;
a magnetic disk rotatably connected with said motor;
an actuator;
a slider connected with said actuator for movement adjacent to said magnetic disk;
a current perpendicular to plane magnetoresistive sensor connected with said slider, said magnetoresistive sensor further comprising:
a pedestal constructed entirely of non-magnetic electrically conductive material having first and second laterally opposed sides defining a trackwidth and having a planar upper surface formed along a first plane and a lower surface formed along a second plane;
first and second insulation layers formed at said first and second laterally opposed sides of said non-magnetic, electrically conductive pedestal;
a first and second antiferromagnetic, AFM layers extending laterally outward from said insulation layers, said first and second AFM layers each having a planar upper surface that is coplanar with said planar upper surface of said pedestal
a first ferromagnetic layer formed on said coplanar upper surfaces of said non-magnetic, electrically conductive material layer and said first and second AFM layers, said ferromagnetic layer being exchange coupled with said first and second AFM layers.

* * * * *

UNITED STATES PATENT AND TRADEMARK OFFICE
CERTIFICATE OF CORRECTION

| | | |
|---|---|---|
| PATENT NO. | : 7,324,311 B2 | Page 1 of 1 |
| APPLICATION NO. | : 10/857095 | |
| DATED | : January 29, 2008 | |
| INVENTOR(S) | : Kim Y. Lee et al. | |

It is certified that error appears in the above-identified patent and that said Letters Patent is hereby corrected as shown below:

In the Specification:

Column 5, line 33 replace "communicated to at d" with --communicate to and--.

Signed and Sealed this
Seventh Day of July, 2015

Michelle K. Lee
*Director of the United States Patent and Trademark Office*